United States Patent
Ueda (10) Patent No.: US 10,304,626 B2
(45) Date of Patent: May 28, 2019

(54) MULTILAYER CERAMIC CAPACITOR AND MANUFACTURING METHOD OF THE SAME

(71) Applicant: TAIYO YUDEN CO., LTD., Chuo-ku, Tokyo (JP)

(72) Inventor: Shusaku Ueda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/916,109

(22) Filed: Mar. 8, 2018

(65) Prior Publication Data

US 2018/0315549 A1 Nov. 1, 2018

(30) Foreign Application Priority Data

Apr. 27, 2017 (JP) ................. 2017-088328

(51) Int. Cl.
| | |
|---|---|
| H01G 4/12 | (2006.01) |
| H01G 4/33 | (2006.01) |
| H01G 4/012 | (2006.01) |
| H01G 4/248 | (2006.01) |

(52) U.S. Cl.
CPC ........... *H01G 4/012* (2013.01); *H01G 4/1227* (2013.01); *H01G 4/33* (2013.01); *H01G 4/248* (2013.01)

(58) Field of Classification Search
CPC ........ H01G 4/012; H01G 4/1227; H01G 4/33; H01G 4/248
USPC ...................................................... 361/301.4
See application file for complete search history.

(56) References Cited

U.S. PATENT DOCUMENTS

| | | | |
|---|---|---|---|
| 2014/0301015 A1* | 10/2014 | Kim | H01G 4/30 361/301.4 |
| 2016/0126014 A1* | 5/2016 | Lee | H01G 4/30 361/301.4 |
| 2016/0196918 A1* | 7/2016 | Hong | H01G 4/0085 174/260 |
| 2017/0154733 A1* | 6/2017 | Lee | H01G 4/308 |

FOREIGN PATENT DOCUMENTS

| | | |
|---|---|---|
| JP | 2002043164 A | 2/2002 |
| JP | 2008207971 A | 9/2008 |
| JP | 2011211033 A | 10/2011 |
| JP | 2014146752 A | 8/2014 |
| JP | 2015029158 A | 2/2015 |

* cited by examiner

*Primary Examiner* — Michael P McFadden
(74) *Attorney, Agent, or Firm* — Law Office of Katsuhiro Arai (57) ABSTRACT

A multilayer ceramic capacitor includes: a multilayer structure in which dielectric layers and internal electrode layers are alternately stacked, the plurality of internal electrode layers being alternately exposed to a first edge face and a second edge face; and side margin regions that cover edge portions to which the plurality of internal electrode layers extend toward two side faces and have a structure in which a first ceramic layer and a second ceramic layer are alternately stacked in a stacking direction of the internal electrode layer and the dielectric layer, an amount of a second-phase of the first ceramic layer being larger than that of the second ceramic layer, a main component of the second-phase being $SiO_2$ or a combination of $SiO_2$ and $B_2O_3$, wherein a content ratio of the second-phase of the first ceramic layer is 15% or more and 45% or less.

4 Claims, 7 Drawing Sheets

| | MARGIN PASTE | | | BAKING | SIDE MARGIN | ELECTRICAL PROPERTY | |
|---|---|---|---|---|---|---|---|
| | SiO$_2$ | B$_2$O$_3$ | TOTAL | RE-OXIDATION TEMPERATURE | CONTENT RATIO OF SECOND-PHASE | CAPACITY | INSULATION RESISTANCE |
| | (wt%) | (wt%) | (wt%) | (°C) | (%) | (μF) | (MΩ) |
| EXAMPLE 1 | 3.0 | 0.0 | 3.0 | 700 | 29 | 10.2 | 112 |
| EXAMPLE 2 | 1.5 | 0.0 | 1.5 | 700 | 17 | 10.8 | 100 |
| EXAMPLE 3 | 5.0 | 0.0 | 5.0 | 700 | 43 | 9.5 | 123 |
| EXAMPLE 4 | 2.5 | 0.5 | 3.0 | 700 | 30 | 10.2 | 105 |
| EXAMPLE 5 | 1.5 | 1.5 | 3.0 | 700 | 31 | 10.3 | 104 |
| EXAMPLE 6 | 0.5 | 2.5 | 3.0 | 700 | 33 | 10.3 | 104 |
| EXAMPLE 7 | 2.1 | 0.0 | 2.1 | 700 | 21 | 10.5 | 105 |
| EXAMPLE 8 | 3.7 | 0.0 | 3.7 | 700 | 34 | 9.9 | 116 |
| EXAMPLE 9 | 3.0 | 0.0 | 3.0 | 600 | 20 | 10.6 | 108 |
| EXAMPLE 10 | 3.0 | 0.0 | 3.0 | 1000 | 37 | 9.6 | 123 |
| COMPARATIVE EXAMPLE 1 | 0.5 | 0.0 | 0.5 | 700 | 3 | 12.3 | 76 |
| COMPARATIVE EXAMPLE 2 | 7.0 | 0.0 | 7.0 | 700 | 53 | 8.7 | 131 |
| COMPARATIVE EXAMPLE 3 | 3.5 | 5.5 | 9.0 | 700 | 54 | 8.9 | 133 |

MULTILAYER CERAMIC CAPACITOR AND MANUFACTURING METHOD OF THE SAME

CROSS-REFERENCE TO RELATED APPLICATION

This application is based upon and claims the benefit of priority of the prior Japanese Patent Application No. 2017-088328, filed on Apr. 27, 2017, the entire contents of which are incorporated herein by reference.

FIELD

A certain aspect of the present invention relates to a multilayer ceramic capacitor and a manufacturing method of the multilayer ceramic capacitor.

BACKGROUND

In a manufacturing process of a multilayer ceramic capacitor having an internal electrode of which a main component is a metal, a stack structure is baked in a strongly reducing atmosphere in order to suppress oxidation of the internal electrode. Therefore, there is a problem that an oxygen defect in a dielectric layer of which a main component is ceramic reduces an insulation resistance. And so, the insulation resistance is increased by performing a re-oxidation process in a weakly oxidizing atmosphere after the baking (for example, see Japanese Patent Application Publication No. 2014-146752 and Japanese Patent Application Publication No. 2008-207971).

SUMMARY OF THE INVENTION

However, with the above-mentioned technology, a capacity may be reduced because of contraction or oxidation of the internal electrode during the re-oxidation process.

The present invention has a purpose of providing a multilayer ceramic capacitor and a manufacturing method of the multilayer ceramic capacitor that are capable of suppressing reduction of a capacity.

According to an aspect of the present invention, there is provided a multilayer ceramic capacitor including: a multilayer structure in which each of a plurality of dielectric layers and each of a plurality of internal electrode layers are alternately stacked, a main component of the dielectric layer being ceramic, the multilayer structure having a rectangular parallelepiped shape, the plurality of internal electrode layers being alternately exposed to a first edge face and a second edge face of the multilayer structure, the first edge face facing with the second edge face; and side margin regions that cover edge portions to which the plurality of internal electrode layers extend toward two side faces other than the first edge face and the second edge face and have a structure in which a first ceramic layer and a second ceramic layer are alternately stacked in a stacking direction of the internal electrode layer and the dielectric layer, an amount of a second-phase of the first ceramic layer being larger than that of the second ceramic layer, a main component of the second-phase being $SiO_2$ or a combination of $SiO_2$ and $B_2O_3$, wherein a content ratio of the second-phase of the first ceramic layer is 15% or more and 45% or less.

According to an aspect of the present invention, there is provided a manufacturing method of a multilayer ceramic capacitor including: a first step of arranging a metal conductive paste on green sheets including a ceramic grain; a second step of arranging a ceramic grain around the metal conductive paste on the green sheets, the ceramic grain including $SiO_2$ or a combination of $SiO_2$ and $B_2O_3$, a total amount of the $SiO_2$ or the combination being 1.5 wt % or more and 5.0 wt % or less; a third step of baking a ceramic multilayer structure in which a plurality of stack units obtained by the second step; and a fourth step of re-oxidizing the ceramic multilayer structure after the third step at 600 degrees C. or more and 1000 degrees C. or less.

DETAILED DESCRIPTION

A description will be given of an embodiment with reference to the accompanying drawings.

Embodiment

Figure 1:
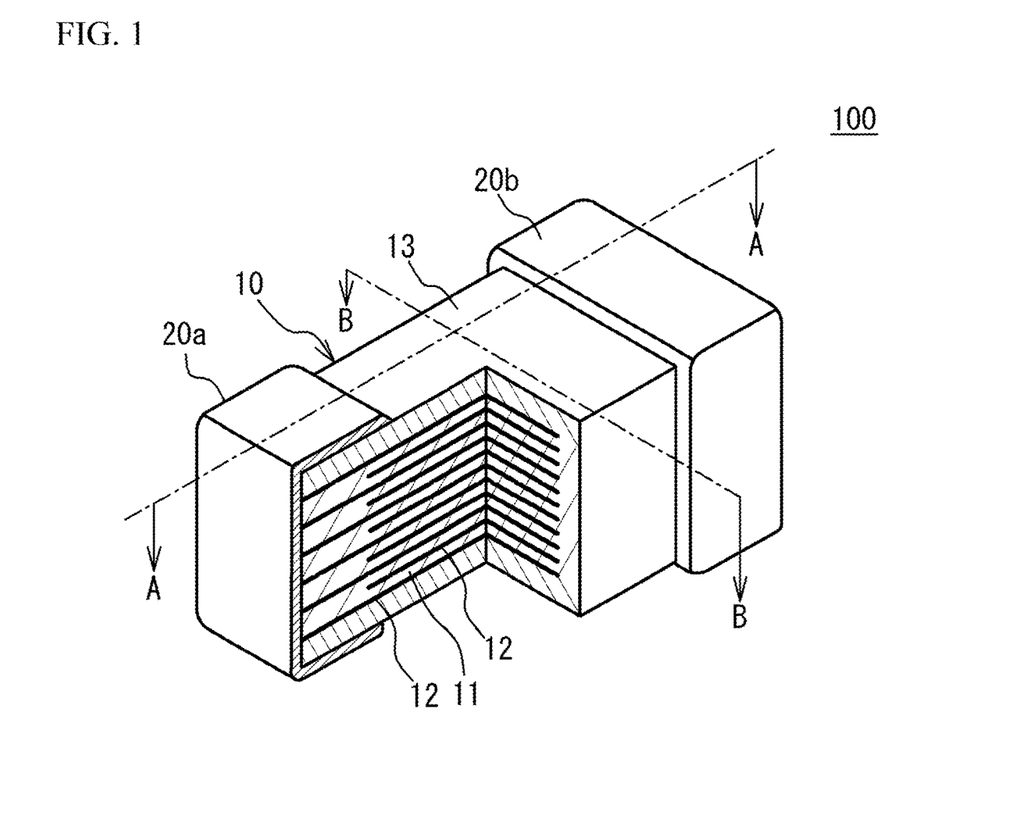
FIG. 1 illustrates a partial perspective view of a multilayer ceramic capacitor.
Figure 2:
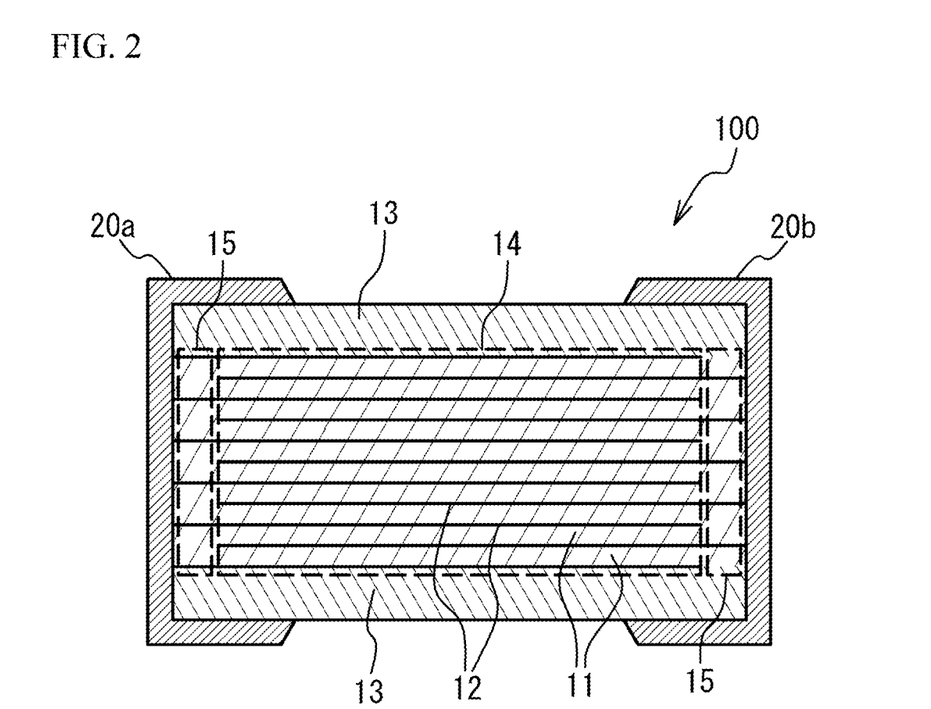
FIG. 2 illustrates a cross sectional view taken along a line A-A of FIG. 1.
Figure 3:
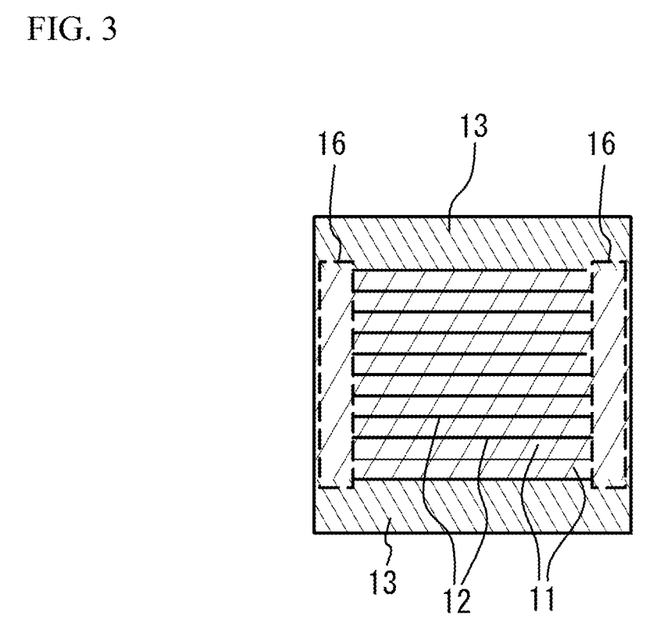
FIG. 3 illustrates a cross sectional view taken along a line B-B of FIG. 1.

A description will be given of a multilayer ceramic capacitor. FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two edge faces of the multilayer chip 10 facing each other.

The multilayer chip 10 has a structure designed to have dielectric layers 11 and internal electrode layers 12 alternately stacked. The dielectric layer 11 includes a ceramic material acting as a dielectric material. The internal electrode layers 12 include a base metal material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer in a stack direction of the dielectric layers 11 and the internal electrode layers 12 (hereinafter referred to as a stack direction). The upper face and the lower face of the multilayer chip 10 that are the internal electrode layers 12 are covered by cover layers 13. A main component of the cover layer 13 is the same as that of the dielectric layer 11.

For example, the multilayer ceramic capacitor 100 may have a length of 0.2 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the external electrodes 20a and 20b and the internal electrode layers 12 is a base metal such as nickel (Ni), copper (Cu), tin (Sn) or the like. The external electrodes 20a and 20b and the internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \le x \le 1$, $0 \le y \le 1$, $0 \le z \le 1$) having a perovskite structure.

As illustrated in FIG. 2, a region, in which a set of the internal electrode layers 12 connected to the external electrode 20a face another set of the internal electrode layers 12 connected to the external electrode 20b, is a region generating electrical capacitance in the multilayer ceramic capacitor 100. And so, the region is referred to as a capacity region 14. That is, the capacity region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. A structure having the capacity region 14 and the end margin regions 15 is also referred to as a stack structure. The stack structure also has a rectangular parallelepiped shape.

Two faces other than two edge faces, an upper face and a lower face of the multilayer chip 10 are referred to as side faces. As illustrated in FIG. 3, a region of the multilayer chip 10 from the two sides faces to the internal electrode layers 12 is referred to as a side margin region 16. That is, the side margin region 16 is a region covering edges of the stacked internal electrode layers 12 in the extension direction toward the two side faces.

For example, it is possible to form the dielectric layers 11 by baking raw material powers of which a main component is ceramic. During the baking, the raw material powers are exposed to a reductive atmosphere. Therefore, an oxygen defect may occur in the ceramic. And so, in the embodiment, an amount of a sintering additive in the side margin region 16 is larger than an amount of a sintering additive in the capacity region 14. With the structure, the sintering additive becomes liquid at a crystal boundary of the side margin region 16, during a re-oxidation process. Oxygen of atmosphere diffuses via the liquid sintering additive. Therefore, even if the re-oxidation is performed at a low temperature, it is possible to sufficiently suppress the oxygen defect of the ceramic in the capacity region 14. When the re-oxidation process is performed at a low temperature, it is possible to suppress contraction, oxidation and so on of the internal electrode layers 12. It is therefore possible to suppress reduction of the capacity of the multilayer ceramic capacitor 100.

Figure 4A:
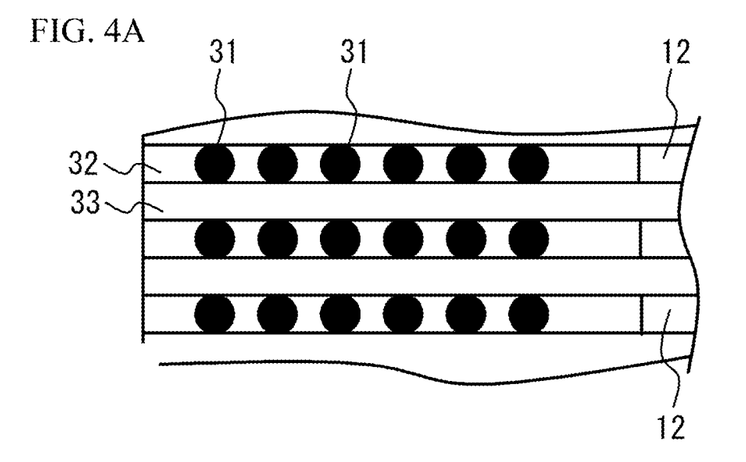
FIG. 4A and FIG. 4B illustrate an enlarged view of a cross section of a side margin region.

Next, a description will be given of details of the side margin region 16. FIG. 4A illustrates an enlarged view of a cross section of the side margin region 16. The side margin region 16 is a region in which the dielectric layers 11 are stacked but does not sandwich the internal electrode layer 12. Moreover, the side margin region 16 has the following structure. That is, the side margin region 16 has a stripe pattern structure in which each of first ceramic layers 32 and each of second ceramic layers 33 are alternately stacked in a stack direction of the dielectric layers 11 and the internal electrode layers 12 in the capacity region 14. An amount of a second-phase 31 generated by the sintering of the sintering additive in the first ceramic layers 32 is relatively large. The amount of the second-phase 31 in the second ceramic layers 33 is relatively small. In the structure, the second-phase 31 of the first ceramic layers 32 acts as a pathway of oxygen. Therefore, the oxygen easily diffuses. A main component of the second-phase 31 is at least one of $SiO_2$ and a combination of $SiO_2$ and $B_2O_3$.

When the amount of the second-phase 31 of the first ceramic layer 32 is small, it is difficult for the oxygen to sufficiently diffuse during the re-oxidation process. And so, in the embodiment, a content ratio of the second-phase 31 of the first ceramic layer 32 is 15% or more. On the other hand, when the amount of the second-phase 31 in the first ceramic layer 32 is excessively large, at least one of $SiO_2$ and $B_2O_3$ diffuses into the capacity region 14. In this case, a relative dielectric constant c of the capacity region 14 decreases. Therefore, the capacity of the multilayer ceramic capacitor 100 may be reduced. And so, in the embodiment, the content ratio of the second-phase 31 of the first ceramic layer 32 is 45% or less. It is preferable that the content ratio of the second-phase 31 of the first ceramic layer 32 is 20% or more and 35% or less. It is more preferable that the content ratio of the second-phase 31 of the first ceramic layer 32 is 25% or more and 30% or less.

Figure 4B:
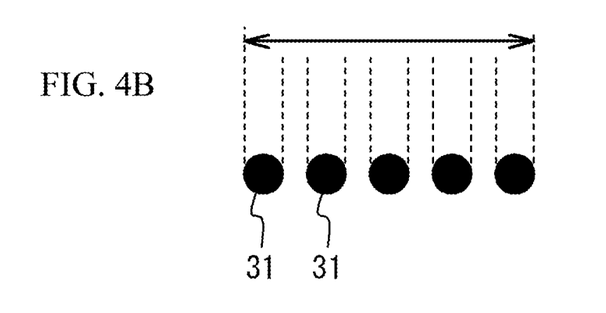
Figure 5:
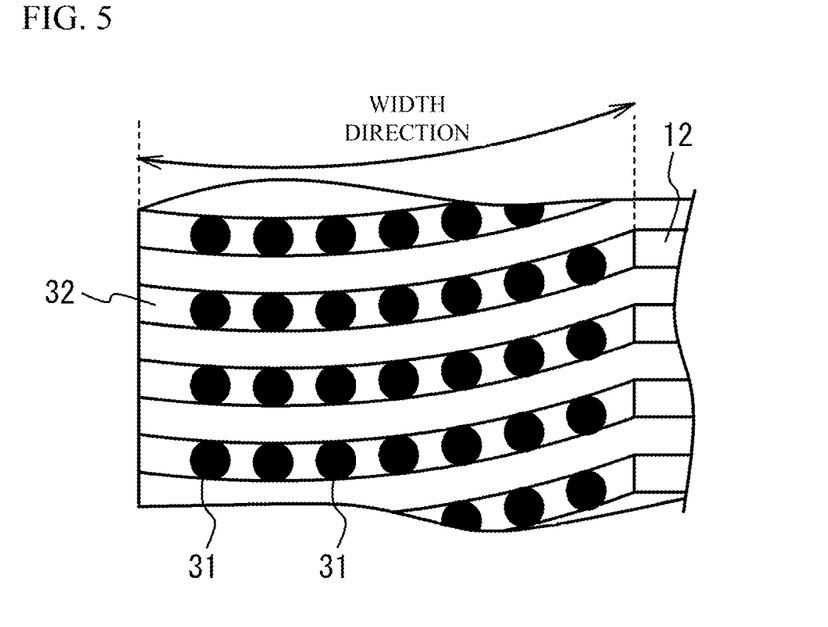
FIG. 5 illustrates a width direction of a first ceramic layer.

A description will be given of a definition of the content ratio of the second-phase 31 in the first ceramic layer 32. As illustrated in FIG. 4B, in the first ceramic layer 32, a plurality of the second-phases 31 appear and are arrayed at a given interval in a width direction (a direction from the side face of the multilayer chip 10 to the capacity region 14). It is possible detect the second-phases 31 as a backscattered electron image by observing SEM (Scanning Electron Microscope) images of the multilayer ceramic capacitor 100 that is subjected to a polishing process. A ratio of a total length of the second-phases 31 with respect to a whole width of the first ceramic payer 32 is defined as the content ratio of the second-phase 31 in the first ceramic layer 32. As illustrated in FIG. 5, there may be a case where the first ceramic layer 32 is inclined with respect to an upper face and a lower face of the multilayer chip 10 of FIG. 1. In the case, the width direction of the first ceramic layer 32 is a direction along the inclined face of the first ceramic layer 32.

Figure 6:
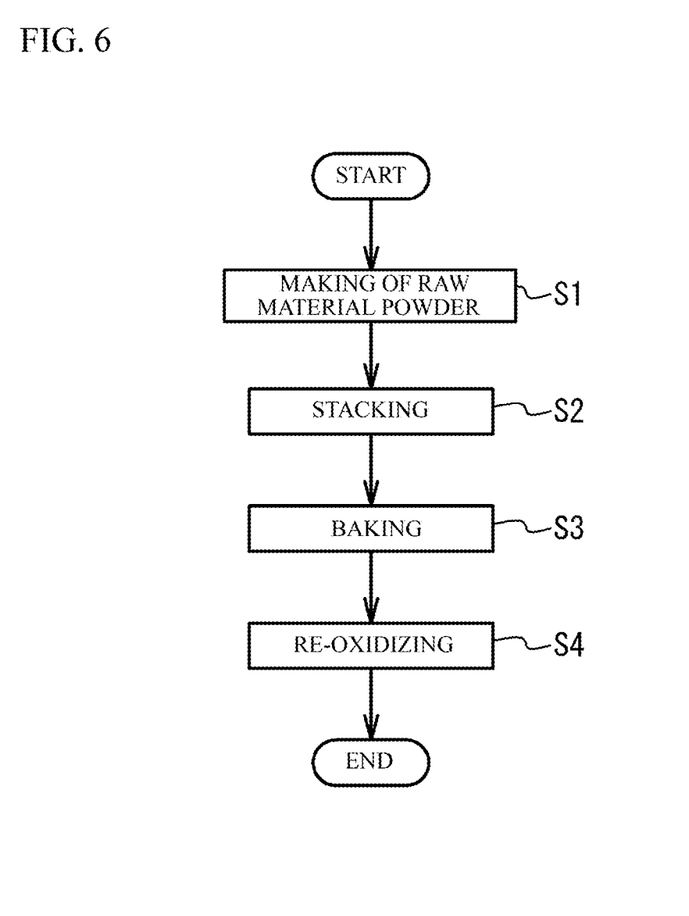
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making Process of a Raw Material Powder)

First, a dielectric material is made. Additive compound may be added to a ceramic material powder that is a main component of the dielectric layer 11 in the capacity region 14, in accordance with purposes. An average grain diameter of the ceramic material power is approximately 0.30 µm. The additive compound may be an oxide of Mg, Mn, V, Cr or a rare earth element (Y, Dy, Tm, Ho, Tb, Yb, Sm, Eu, Gd and Er), or an oxide of Co, Ni, Li, B, Na, K and Si, or glass. For example, compound including additive compound is added to a ceramic material powder and is calcined. Next, the resulting ceramic material grains are wet-blended with additive compound, is dried and is crushed. Thus, the ceramic material powder is prepared. Thereby, the dielectric material is made.

Next, a margin paste material is made. Additive compound may be added to a ceramic material powder that is a main component of the dielectric layer 11 (the first ceramic layer 32 and the second ceramic layer 33) in the side margin region 16, in accordance with purposes. An average grain diameter of the ceramic material power is approximately 0.20 µm. The additive compound may be an oxide of Mg, Mn, V, Cr or a rare earth element (Y, Dy, Tm, Ho, Tb, Yb, Sm, Eu, Gd and Er), or an oxide of Co, Ni, Li, B, Na, K and Si, or glass. For example, compound including additive compound is added to a ceramic material powder and is calcined. Next, the resulting ceramic material grains are wet-blended with additive compound, is dried and is crushed. Thus, the ceramic material powder is prepared. α terpineol, mineral spirit, organic vehicle and so on are blended with the resulting ceramic material and are kneaded with the resulting ceramic material. Thereby, the margin paste is made. A total amount of $SiO_2$ and $B_2O_3$ in the margin paste is 1.5 wt % or more and 5.0 wt % or less, on a presumption that the powder of the main component ceramic material is 100 wt %. When the total amount is 1.5 wt % or more and 5.0 wt % or less, the content ratio of the second-phase 31 of the first ceramic layer 32 can be 15% or more and 45% or less. It is preferable that the total amount of $SiO_2$ and $B_2O_3$ in the margin paste is 2.0 wt % or more and 3.0 wt % or less.

(Stacking Process)

Next, a binder such as polyvinyl butyral (PVB) resin, an organic solvent such as ethanol or toluene, and a plasticizer such as dioctyl phthalate (DOP) are added to the resulting dielectric material powder and wet-blended. With use of the resulting slurry, a strip-shaped dielectric green sheet with a thickness of 0.8 µm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste. Next, the margin paste is printed on a circumference area of the dielectric green sheet on which the conductive paste is not printed. Thus, a pattern-formed sheet is formed as a stack unit.

Then, the pattern-formed sheet is stamped into a predetermined size, and a predetermined number (for example, 200 to 500) of stamped pattern-formed sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations.

Cover sheets, which are to be the cover layers 13, are compressed on the stacked pattern-formed sheets and under the stacked sheets. The resulting compact is cut into a predetermined size (for example, 1.0 mm×0.5 mm). Thus, a ceramic multilayer structure having a rectangular parallelepiped shape is obtained.

(Baking Process)

Next, after removing the binder in $N_2$ atmosphere at 250 degrees C. to 500 degrees C., the resulting ceramic multilayer structure is baked for ten minutes to 2 hours in a reductive atmosphere in a temperature range of 1100 degrees C. to 1300 degrees C. Thus, each compound structuring the dielectric green sheet is sintered and grows. In this manner, a sintered structure having the multilayer chip 10 having the multilayer structure in which the sintered dielectric layers 11 and the sintered internal electrode layers 12 are alternately stacked and having the cover layers 13 formed as outermost layers of the multilayer chip 10 in the stack direction is obtained.

(Re-Oxidation Process)

After that, a re-oxidation process is performed in $N_2$ gas atmosphere. In the re-oxidation process, the second-phase 31 becomes liquid, and oxygen in the atmosphere diffuses via the liquid second-phase 31. Thus, it is possible to promote the re-oxidation of the dielectric layers 11 in the capacity region 14. When the temperature of the re-oxidation process is excessively low, it is difficult for oxygen to sufficiently diffuse. And so, in the embodiment, the temperature of the re-oxidation process is 600 degrees C. or more. On the other hand, when the temperature of the re-oxidation process is excessively high, the relative dielectric constant ε of the capacity region 14 may be reduced because of the oxidation, the contraction and so on of the internal electrode layer 12. And so, in the embodiment, the temperature of the re-oxidation process is 1000 degrees C. or less. It is preferable that the temperature of the re-oxidation process is 700 degrees C. or more and 800 degrees C. or less.

EXAMPLES

The multilayer ceramic capacitors 100 in accordance with the embodiment were made. And, property of the multilayer ceramic capacitors 100 was measured.

Examples 1 to 10

Barium titanate powders (an average grain diameter of 0.30 µm) of 100 wt %, $Ho_2O_3$ (2 wt %), MgO (0.2 wt %), $MnCO_3$ (0.2 wt %), and $SiO_2$ (0.3 wt %) were weighed. $BaCO_3$ was weighed so that the Ba/Ti ratio after mixing was 1.000. The material was sufficiently wet-blended and was crushed in a ball mill. Thus, blended powders were obtained. The resulting blended powders were used as the dielectric material.

Barium titanate powders (an average grain diameter of 0.20 μm) of 100 wt %, $Ho_2O_3$ (2 wt %), MgO (0.2 wt %), and $MnCO_3$ (0.2 wt %) were weighed. In the examples 1, 4 to 6, 9 and 10, 3.0 wt % of a total amount of $SiO_2$ and $B_2O_3$ was weighed. In the example 2, 1.5 wt % of the total amount of $SiO_2$ and $B_2O_3$ was weighed. In the example 3, 5.0 wt % of the total amount of $SiO_2$ and $B_2O_3$ was weighed. In the example 7, 2.1 wt % of the total amount of $SiO_2$ and $B_2O_3$ was weighed. In the example 8, 3.7 wt % of the total amount of $SiO_2$ and $B_2O_3$ was weighed. Moreover, $BaCO_3$ was weighed so that the Ba/Ti ratio after mixing was 1.000. The material was sufficiently wet-blended and was crushed. Thus, the blended powders were obtained. The resulting mixed powders were used as the margin paste material. Next, 80 weight part of α terpionel, 20 weight part of mineral spirit, and organic vehicle were blended with 100 weight part of the resulting margin paste material. The blended material was kneaded with three rollers. Thus, the margin paste was obtained. A viscosity of the margin paste was 100 Pa·s.

As an organic binder, acrylic was added to the dielectric material. As a solvent, toluene and ethyl alcohol were added to the dielectric material. And green sheets of 2 μm were formed by a doctor blade method. The conductive paste for forming the internal electrode was screen-printed on the green sheets. Thus, the conductive paste for forming the internal electrode of 1 μm was formed. Moreover, the margin paste having a reverse pattern with respect to the internal electrode was screen-printed on the green sheets. The thickness of the margin paste was 1 μm.

400 sheets of the pattern-formed sheet were stacked. A cover sheet of 200 μm was stacked on the multilayer structure. Another cover sheet of 200 μm was stacked under the multilayer structure. After that, a ceramic multilayer structure was obtained by a thermal compression. The ceramic multilayer structure was stamped into a predetermined shape. Ground layers of external electrodes were formed on the ceramic multilayer structure by a dipping method. The binder was removed in $N_2$ atmosphere. The resulting ceramic multilayer structure was baked at 1260 degrees C. in a reductive atmosphere ($O_2$ partial pressure: $10^{-5}$ atm to $10^{-8}$ atm). Thus, a sintered structure was obtained. The length, the width and the height of the sintered structure were 1.6 mm, 0.8 mm and 0.8 mm.

The sintered structure was subjected to the re-oxidation process for 2 hours in $N_2$ gas atmosphere. In the examples 1 to 8, the sintering temperature of the re-oxidation process was 700 degrees C. In the example 9, the sintering temperature of the re-oxidation process was 600 degrees C. In the example 10, the sintering temperature of the re-oxidation process was 1000 degrees C. Cu, Ni and Sn were coated on a surface of a ground layer of the external electrodes by an electroplating. Thus, the multilayer ceramic capacitors were formed.

Comparative Examples 1 to 3

An amount of $SiO_2$ and $B_2O_3$ in the margin paste was changed. In the comparative examples 1 to 3, the baking temperature of the re-oxidation process was 700 degrees C. Other conditions were the same as those of the examples 1 to 6.

(Analysis)

After polishing the multilayer ceramic capacitors, SEM images were observed. From backscattered electron images, of the side margin region 16, the content ratio of the second-phase 31 of the side margin region 16 was calculated as described on the basis of FIG. 4B. The electrostatic capacity of the capacity region 14 was measured with an impedance analyzer 4284A made by Hewlett Packard. The OSC was 1V. The frequency was 1 KHz. The insulation resistance was measured with 4339A high resistance meter made by Hewlett Packard. The voltage for measuring was 10 V. The holding time was 60 seconds.

Figure 7:
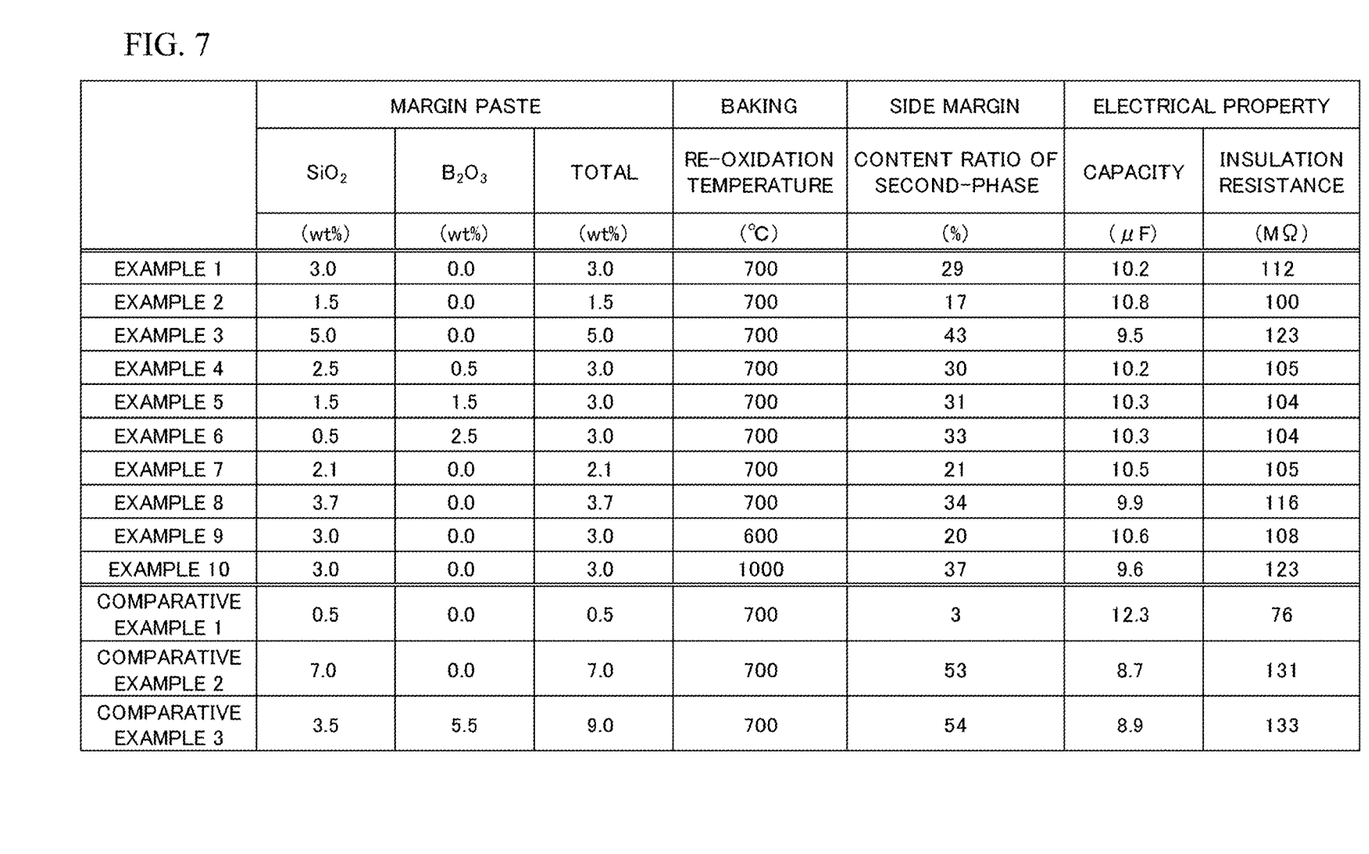
FIG. 7 illustrates results of examples and comparative examples.

FIG. 7 illustrates the total amount of $SiO_2$ and $B_2O_3$ in the margin paste, the sintering temperature of the re-oxidation process, the content ratio of the second-phase 31 in the first ceramic layer 32, an electrostatic capacity and an insulation resistance of the examples 1 to 10 and the comparative examples 1 to 3. When the electrostatic capacity of the capacity region 14 was 10 μF±1 μF, it was determined that a preferable electrostatic capacity was achieved. When the insulation resistance was 100 MΩ or more, it was determined that a preferable insulation resistance was achieved.

In any of the examples 1 to 10, a preferable electrostatic capacity and a preferable insulation resistance were achieved. It is thought that the preferable insulation resistance was achieved because the content ratio of the second-phase 31 of the first ceramic layer 32 was 15% or more and 45% or less and the oxygen sufficiently diffused. It is thought that the preferable electrostatic capacity was achieved because the temperature of the re-oxidation process was 600 degrees C. or more and 1000 degrees C. or less and the contraction, the oxidation and so on of the internal electrode layer 12 were suppressed.

It is thought that the reduction of the capacity was suppressed because the temperature of the re-oxidation process was 700 degrees C. in the comparative example 1. However, it is thought that the content ratio of the second-phase 31 of the first ceramic layer 32 was low, the oxygen defect of the ceramic of the dielectric layer 11 in the capacity region 14 was not suppressed and the insulation resistance was reduced.

It is thought that the content ratio of the second-phase 31 of the first ceramic layer 32 was high, the diffusion of the oxygen was promoted, and the insulation resistance became high, in the comparative examples 2 and 3. However, it is thought that the content ratio of the second-phase 31 of the first ceramic layer 32 was high, $SiO_2$ and $B_2O_3$ diffused into the capacity region 14, the relative dielectric constant c of the capacity region 14 was reduced, and the capacity decreased.

From the results of the examples 1 to 10, the content ratio of the second-phase 31 of the first ceramic layer 32 was 15% or more and 45% or less because the total amount of $SiO_2$ and $B_2O_3$ in the margin paste was 1.5 wt % or more and 5.0 wt % or less and the sintering temperature of the re-oxidation process was 600 degrees C. or more and 1000 degrees C. or less.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer structure in which each of a plurality of dielectric layers and each of a plurality of internal electrode layers are alternately stacked, a main component of the dielectric layer being ceramic, the multilayer structure having a rectangular parallelepiped shape, the plurality of internal electrode layers being alternately exposed to a first edge face and a second edge face of the multilayer structure, the first edge face facing with the second edge face; and side margin regions that cover edge portions to which the plurality of internal electrode layers extend toward two side faces other than the first edge face and the second edge face and have a structure in which a first ceramic layer and a second ceramic layer are alternately stacked in a stacking direction of the internal electrode layer and the dielectric layer, an amount of a second-phase of the first ceramic layer being larger than that of the second ceramic layer, a main component of the second-phase being $SiO_2$ or a combination of $SiO_2$ and $B_2O_3$, wherein a content ratio of the second-phase of the first ceramic layer is 15% or more and 45% or less.

2. The multilayer ceramic capacitor as claimed in claim 1, wherein a plurality of the second-phase are arrayed toward the multilayer structure in the first ceramic layer at a given interval.

3. The multilayer ceramic capacitor as claimed in claim 1, wherein a main component of the dielectric layer is barium titanate.

4. The multilayer ceramic capacitor as claimed in claim 1, wherein the content ratio of the second-phase of the first ceramic layer is 20% or more and 35% or less.

* * * * *